United States Patent
Suh et al.

(10) Patent No.: US 7,602,872 B2
(45) Date of Patent: Oct. 13, 2009

(54) SCHEDULING APPARATUS AND METHOD IN A MULTICARRIER COMMUNICATION SYSTEM

(75) Inventors: Chang-Ho Suh, Seongnam-si (KR);
Seung-Hoon Park, Seoul (KR);
Seok-Hyun Yoon, Suwon-si (KR);
Sung-Kwon Hong, Seoul (KR);
Young-Kwon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 598 days.

(21) Appl. No.: 11/112,906

(22) Filed: Apr. 22, 2005

(65) Prior Publication Data

US 2006/0146920 A1 Jul. 6, 2006

(30) Foreign Application Priority Data

Dec. 31, 2004 (KR) .................. 10-2004-0118314

(51) Int. Cl.
*H04L 7/00* (2006.01)
(52) U.S. Cl. .................. 375/357; 375/258; 375/260
(58) Field of Classification Search .................. 375/260, 375/221, 267, 256, 269, 279, 362, 355, 308, 375/334, 357, 216, 258, 141, 233–236; 708/5, 708/8, 21, 404
See application file for complete search history.

(56) References Cited

U.S. PATENT DOCUMENTS

2002/0147017 A1  10/2002  Li et al.
2004/0203476 A1*  10/2004  Liu .............................. 455/69

FOREIGN PATENT DOCUMENTS

| JP | 2004-312291 | 11/2004 |
| KR | 2003-0020158 | 3/2003 |
| KR | 1020040032044 | 4/2004 |
| RU | 2275748 | 4/2006 |
| WO | WO 03/058871 | 7/2003 |

OTHER PUBLICATIONS

Han et al., "Opportunistic scheduling with partial channel information in OFDM/FDD systems", IEEE, Sep. 2004, pp. 511-514.*
Svedman et al.,"a QOS-aware proportional fair scheduler for opportunistic OFDM", IEEE, Sep. 2004, pp. 558-562.*
Patrick Svedman et al., A QoS-Aware Proportional Fair Scheduler for Opportunistic OFDM, Vehicular Technology Conference, Sep. 26-29, 2004.
Zhong-Hai Han et al., "Opportunistic Scheduling with Partial Channel Information in OFDMA/FDD Systems", Vehicular Technology Conference, Sep. 26-29, 2004.
Patrick Svedman et al., "A Simplified Opportunistic Feedback and Scheduling Scheme for OFDM", Vehicular Technology Conference, May 17-19, 2004.
Brian Classon et al., "Multi-Dimensional Adaptation and Multi-user Scheduling Techniques for Wireless OFDM Systems", IEEE International Conference on Communications, May 11-15, 2003.

* cited by examiner

*Primary Examiner*—Mohammad H Ghayour
*Assistant Examiner*—Rahel Guarino
(74) *Attorney, Agent, or Firm*—The Farrell Law Firm, LLP (57) ABSTRACT

In multicarrier communication system using N subcarriers, in which a transmitter communicates with K receivers, the transmitter determines a channel quality information (CQI) feedback quantity indicative of the number of subcarriers for which CQIs will be fed back among the N subcarriers, for the K receivers, and transmits the CQI feedback quantity to the K receivers. Thereafter, upon receiving CQIs corresponding to the determined CQI feedback quantity, being fed back from the K receivers, the transmitter allocates subcarriers for which there are CQIs being fed back from at least one receiver among the K receivers among the N subcarriers, to any one receiver among the receivers that have fed back CQIs according to a first scheme, thereby guaranteeing the maximum throughput and the maximum fairness.

24 Claims, 7 Drawing Sheets

SCHEDULING APPARATUS AND METHOD IN A MULTICARRIER COMMUNICATION SYSTEM

PRIORITY

This application claims priority under 35 U.S.C. § 119 to an application entitled "Scheduling Apparatus and Method in a Multicarrier Communication System" filed in the Korean Intellectual Property Office on Dec. 31, 2004 and assigned Serial No. 2004-118314, the contents of which are incorporated herein by reference.

BACKGROUND OF THE INVENTION

1. Field of the Invention

The present invention relates generally to a scheduling apparatus and method for a communication system, and in particular, to an apparatus and method for performing scheduling using channel quality information (CQI) for only particular carriers in a communication system using multiple carriers (multicarrier communication system).

2. Description of the Related Art

Extensive research is being conducted on a $4^{th}$ generation (4G) communication system which is the next generation communication system to provide users with services having various Qualities of Service (QoSs) supporting a high data rate. In particular, extensive research is being conducted on the 4G communication system to support a high-speed service guaranteeing mobility and a QoS in a Broadband Wireless Access (BWA) communication system such as a wireless Local Area Network (LAN) system and a wireless Metropolitan Area Network (MAN) system.

In order to provide a high-speed, high-quality wireless multimedia service, the 4G communication system requires broadband spectrum resources. However, the use of the broadband spectrum resources increases a fading effect in a wireless transmission path due to multipath propagation, and causes a frequency selective fading effect even in a transmission band. Therefore, for the high-speed wireless multimedia service, an Orthogonal Frequency Division Multiplexing (OFDM) scheme which is robust against frequency selective fading is popularly used in the 4G communication systems.

The OFDM scheme, a scheme for transmitting data using multiple carriers, is a kind of a Multi-Carrier Modulation (MCM) scheme that prior to transmission parallel-converts a serial input symbol stream into parallel symbols and modulates the parallel symbols with a plurality of orthogonal subcarriers. The OFDM scheme has the advantage of being capable of maximizing throughput using a link adaptation scheme in addition to being robust against the frequency selective fading.

A multiple access scheme based on the OFDM scheme is referred to as an Orthogonal Frequency Division Multiple Access (OFDMA) scheme. The OFDMA scheme reorders particular subcarriers among all of subcarriers into a subchannel and allocates the subchannel to a particular subscriber station (SS). The "subchannel" refers to a channel comprised of at least one subcarrier. The use of the OFDMA scheme enables a dynamic resource allocation in which a subchannel can be dynamically allocated to a particular SS based on a fading characteristic of a wireless channel, and in the OFDMA scheme, an increase in number of SSs, i.e. an increase in number of users, increases a 'multiuser diversity gain'. Therefore, extensive studies of the OFDMA scheme is being conducted in the 4G communication system that requires relatively high throughput.

In all of the communication systems in which a multiuser environment is implemented, it is necessary to efficiently allocate resources to each user, i.e. SS, and a communication system using the OFDMA scheme (OFDMA communication system) should also efficiently allocate resources. For convenience, a description of a communication system supporting the multiuser environment (multiuser environment communication system) will be made herein with reference to the OFDMA communication system. A description will now be made of scheduling schemes proposed for the efficient allocation of resources in the multiuser environment communication system.

The scheduling scheme refers to a scheme for allocating resources to each SS, and the typical scheduling schemes include a Maximum Carrier-to-Interference ratio (Max C/I) scheme, a Maximum Fairness (MF) scheme, and a Proportional Fairness (PF) scheme. A description will now be made of the Max C/I scheme, the MF scheme, and the PF scheme.

(1) Max C/I Scheme

The Max C/I scheme is a scheduling scheme for allocating particular subcarriers to an SS having the best channel state from among a plurality of SSs in the multiuser environment communication system, i.e. the OFDMA communication system, and the use of the Max C/I scheme maximizes a multiuser diversity gain, thereby maximizing the entire throughput of the OFDMA communication system. Each of the SSs reports a state of a channel to its associated base station (BS), i.e. channel quality, for example, CQI representing a C/I, back to the BS, and the BS regards, as an SS having the best channel state, an SS that has fed back a CQI representing the maximum C/I among CQIs fed back from the SSs.

In the Max C/I scheme, if C/Is for all of the subcarriers have small values because of a very poor channel state of a particular SS, the particular SS cannot be allocated any subcarrier on a certain occasion. That is, because the Max C/I scheme allocates corresponding subcarriers to an SS having the best channel state for all of the subcarriers used in the OFDMA communication system, an SS having a very poor channel state may fail to be allocated even one subcarrier on a certain occasion.

The Max C/I scheme allocates subcarriers based only on a channel state between a BS and an SS, thus making it impossible to guarantee fairness between SSs. However, the Max C/I scheme which is easily implemented is superior to the other scheduling schemes in terms of complexity.

Due to the foregoing characteristics, the Max C/I scheme is chiefly used for the maximization of the entire throughput of the OFDMA communication system even though fairness between SSs is not guaranteed. However, the Max C/I scheme's advantage of maximizing the entire throughput of the OFDMA communication system is acquired only when each of the SSs can feed back CQIs for all subcarriers. That is, when each of the SSs feeds back CQIs for only particular subcarriers instead of all of the subcarriers, the Max C/I scheme's advantage of maximizing the entire throughput of the OFDMA communication system is not guaranteed. The reason for considering the case in which the SS feeds back CQIs for only particular subcarriers instead of all subcarriers in the OFDMA communication system is because the CQI feedback for all of the subcarriers causes an uplink load and functions as uplink interference to other SSs. Therefore, there is extensive research being conducted on feeding back CQIs for only particular subcarriers instead of all the subcarriers.

(2) MF Scheme

The MF scheme is a scheduling scheme proposed to maximize the throughput of an SS allocated the minimum throughput among throughputs of a plurality of SSs. Compared with the Max C/I scheme, the MF scheme can guarantee some lever of fairness between the SSs. Although the MF scheme actually maximizes the fairness between the SSs as compared with the Max C/I scheme, the entire throughput of the OFDMA communication system is undesirably reduced due to the fairness between the SSs.

Generally, the MF scheme compulsorily allocates a subcarrier for an SS having a very poor channel state, if any. Therefore, compared with allocation of the subcarrier to an SS having the best channel state, i.e. the maximum C/I, the allocation of the subcarrier to the SS having a very poor channel state causes a decrease in throughput, thereby reducing the entire throughput of the OFDMA communication system.

Due to the foregoing characteristics, the use of the MF scheme is not taken into consideration in a wireless communication system like the OFDMA communication system. Instead, the use of the MF scheme is chiefly used in a wire communication system in which a bottleneck link due to setup of many links between a source and a destination may fatally affect the entire performance of the communication system. In addition, the MF scheme is significantly higher than the Max C/I scheme in terms of implementation complexity. Actually, the use of the MF scheme is scarcely taken into consideration in the OFDMA communication system.

The MF scheme's advantage of maximizing fairness between SSs is acquired only when each of the SSs feeds back CQIs for all of the subcarriers. That is, when each of the SSs feeds back CQIs for only particular subcarriers instead of all of the subcarriers, the MF scheme's advantage of maximizing fairness between SSs is not guaranteed.

(3) PF Scheme

The PF scheme, a combined scheme of the Max C/I scheme and the MF scheme, is a scheduling scheme for maximizing the entire throughput while guaranteeing fairness between SSs. The PF scheme maximizes the entire throughput while guaranteeing some level of fairness between SSs, and exhibits superior performance. Therefore, the PF scheme is popularly used in the OFDMA communication system. In addition, the PF scheme can be implemented at lower complexity in a communication system using a single carrier (single-carrier communication system).

However, when used in multicarrier communication systems such as the OFDM communication system and the OFDMA communication system, the PF scheme increases in terms of complexity, and there is no proposed solution for the increase in complexity. The PF scheme's advantage of maximizing the entire throughput while guaranteeing fairness between SSs is acquired only when each of the SSs feeds back CQIs for all of the subcarriers. That is, when each of the SSs feeds back CQIs for only particular subcarriers instead of all of the subcarriers, the PF scheme's advantage of maximizing the entire throughput while guaranteeing fairness between the SSs is not guaranteed.

SUMMARY OF THE INVENTION

As described above, the Max C/I scheme, the MF scheme and the PF scheme are scheduling schemes proposed on the assumption that each of the SSs feeds back CQIs for all of the subcarriers. Therefore, the advantages of the Max C/I scheme, the MF scheme and the PF scheme cannot be guaranteed when the SSs feed back CQIs for only particular subcarriers instead of all of the subcarriers in the OFDMA communication system.

However, in the OFDMA communication system in which the SSs feed back CQIs for only particular subcarriers, when both complexity and performance are taken into consideration, the Max C/I scheme is superior to the MF scheme and the PF scheme. For the Max C/I scheme, it has been proven that a decrease in CQI feedback quantity causes a decrease in the entire throughput. However, how the decrease in CQI feedback quantity will affect the fairness between SSs has never been taken into consideration. The "CQI feedback quantity" refers to the number of subcarriers, CQIs for which are fed back. Therefore, there is a demand for a new scheduling scheme capable of maintaining fairness between SSs, maximizing throughput and guaranteeing minimum complexity in the OFDMA communication system.

It is, therefore, an object of the present invention to provide a scheduling apparatus and method in a multicarrier communication system.

It is another object of the present invention to provide a scheduling apparatus and method for guaranteeing a level of fairness between subscriber stations (SSs) in a multicarrier communication system.

It is further another object of the present invention to provide a scheduling apparatus and method for maximizing throughput in a multicarrier communication system.

It is still another object of the present invention to provide a scheduling apparatus and method for varying CQI feedback quantity in a multicarrier communication system.

In accordance with one aspect of the present invention, there is provided a scheduling method for use in a transmitter which communicates with K receivers, in a multicarrier communication system using N subcarriers, the method including the steps of determining a channel quality information (CQI) feedback quantity indicative of the number of subcarriers for which CQIs will be fed back among the N subcarriers, for the K receivers; receiving CQIs corresponding to the determined CQI feedback quantity, being fed back from the K receivers; and allocating subcarriers for which there are CQIs being fed back from at least one receiver among the K receivers among the N subcarriers, to any one receiver among the receivers that have fed back CQIs according to a first scheme.

In accordance with another aspect of the present invention, there is provided a method for feeding back channel quality information (CQI) by a receiver, in a multicarrier communication system using N subcarriers, the method including the steps of receiving, from a transmitter, a CQI feedback quantity indicative of the number of subcarriers for which CQIs will be fed back among the N subcarriers; detecting CQIs for the N subcarriers by channel-estimating a signal received from the transmitter; and selecting a number of CQIs equal to the CQI feedback quantity among the CQIs for the N subcarriers, generating the selected CQIs into a partial CQI, and transmitting the partial CQI to the transmitter.

In accordance with further another aspect of the present invention, there is provided a scheduling method in a multicarrier communication system using N subcarriers, in which a transmitter communicates with K receivers, the method including the steps of determining, by the transmitter, a channel quality information (CQI) feedback quantity indicative of the number of subcarriers for which CQIs will be fed back among the N subcarriers, for the K receivers, and transmitting the CQI feedback quantity to the K receivers; receiving, by each of the K receivers, the CQI feedback quantity from the transmitter, and detecting CQIs for the N subcarriers by channel-estimating a signal received from the transmitter; selecting, by each of the K receivers, a number of CQIs equal to the CQI feedback quantity among the CQIs for the N subcarriers, generating the selected CQIs into a partial CQI, and feeding back the partial CQI to the transmitter; and upon receipt by the transmitter of a number of CQIs equal to the determined CQI feedback quantity, being fed back from the K receivers, allocating subcarriers for which there are CQIs being fed back from at least one receiver among the K receivers among the N subcarriers, to any one receiver among the receivers that have fed back CQIs according to a first scheme.

In accordance with still another aspect of the present invention, there is provided a scheduling apparatus of a transmitter which communicates with K receivers, in a multicarrier communication system using N subcarriers, the apparatus including a channel quality information (CQI) feedback quantity determiner for determining a CQI feedback quantity indicative of the number of subcarriers for which CQIs will be fed back among the N subcarriers, for the K receivers; a reception part for receiving CQIs corresponding to the determined CQI feedback quantity, being fed back from the K receivers; a scheduler for allocating subcarriers for which there are CQIs being fed back from at least one receiver among the K receivers among the N subcarriers, to any one receiver among the receivers that have fed back CQIs according to a first scheme; and a transmission part for transmitting the determined CQI feedback quantity to the K receivers.

In accordance with still another aspect of the present invention, there is provided an apparatus for feeding back channel quality information (CQI) by a receiver, in a multicarrier communication system using N subcarriers, the apparatus including a reception part for receiving, from a transmitter, a CQI feedback quantity indicative of the number of subcarriers for which CQIs will be fed back among the N subcarriers, and detecting CQIs for the N subcarriers by channel-estimating a signal received from the transmitter; a CQI generator for selecting as many CQIs as a number corresponding to the CQI feedback quantity among the CQIs for the N subcarriers, and generating the selected CQIs into a partial CQI; and a transmission part for transmitting the partial CQI to the transmitter.

In accordance with still another aspect of the present invention, there is provided a scheduling apparatus in a multicarrier communication system using N subcarriers, in which a transmitter communicates with K receivers, the apparatus including the transmitter for determining a channel quality information (CQI) feedback quantity indicative of the number of subcarriers for which CQIs will be fed back among the N subcarriers, for the K receivers, transmitting the CQI feedback quantity to the K receivers, and upon receiving CQIs corresponding to the determined CQI feedback quantity, being fed back from the K receivers, allocating subcarriers for which there are CQIs being fed back from at least one receiver among the K receivers among the N subcarriers, to any one receiver among the receivers that have fed back CQIs according to a first scheme; and K receivers for receiving the CQI feedback quantity from the transmitter, detecting CQIs for the N subcarriers by channel-estimating a signal received from the transmitter, selecting a number of CQIs equal to the CQI feedback quantity among the CQIs for the N subcarriers, generating the selected CQIs into a partial CQI, and feeding back the partial CQI to the transmitter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

The present invention proposes an apparatus and method for scheduling using channel quality information (CQI) for only particular carriers in a communication system using multiple carriers (multicarrier communication system). In particular, the present invention proposes a scheduling apparatus and method for maximizing throughput and guaranteeing a level of fairness between subscriber stations (SSs) by performing scheduling based on a Maximum Carrier-to-Interference ratio (Max C/I) scheme using CQIs for the particular carriers. For the sake of convenience, a description of the multicarrier communication system will be made herein with reference to a communication system using an Orthogonal Frequency Division Multiple Access (OFDMA) scheme which is a multiple access scheme based on an Orthogonal Frequency Division Multiplexing (OFDM) scheme (OFDMA communication system).

The scheduling scheme proposed by the present invention is based on the Max C/I scheme which is a scheduling scheme that reduces the complexity of the scheduling scheme in the OFDMA communication system, guarantees a level of fairness between SSs, and controls the SSs to feed back CQIs for only particular subcarriers instead of all of the subcarriers while taking into consideration uplink load and uplink interference caused by CQI feedback in the OFDMA communication system. The operation of feeding back CQIs for only particular subcarriers instead of all of the subcarriers in the OFDMA communication system will be referred to as a "partial CQI feedback operation," and the CQIs for the particular subcarriers will be referred to as a "partial CQI." The scheduling scheme proposed by the present invention, i.e. the scheme for performing scheduling based on the Max C/I scheme using the partial CQI, will be referred to as an "adaptive scheduling scheme."

The adaptive scheduling scheme proposed by the present invention exhibits the can following 3 qualities.

(1) Minimization of CQI Feedback Quantity

The minimization of the CQI feedback quantity functions as a very important factor in the performance improvement of a multicarrier communication system like the OFDMA communication system, because the CQI feedback functions as an uplink load and an uplink interference as described above.

Herein, the "CQI feedback quantity" refers to the number of subcarriers, for which CQIs are fed back.

(2) Minimization of Scheduling Complexity

The minimization of the scheduling complexity also functions as a very important factor in the performance improvement of a multicarrier communication system like the OFDMA communication system, because the minimization of scheduling complexity reduces the cost of the devices. The reason for reducing the cost of devices is because the minimization of scheduling complexity can minimize power consumption and decrease the number of component blocks constituting the multicarrier communication system, making it possible to produce the devices at lower prices.

In particular, when using a Maximum Fairness (MF) scheme and a Proportional Fairness (PF) scheme chiefly used in a conventional communication system using a single carrier (single-carrier communication system), the multicarrier communication system increases in complexity. Therefore, it is difficult for the multicarrier communication system to use the MF scheme and the PF scheme.

(3) Maximization of Throughput and Fairness

In an actual wireless communication system, it is not possible to exclude a fairness problem between the SSs in order to maximize the entire throughput of the wireless communication system, and also, it is not possible to exclude a throughput problem in order to maximize fairness between the SSs. That is, a scheduling scheme considering both the throughput and the fairness is an optimum scheduling scheme, and the adaptive scheduling scheme proposed by the present invention guarantees the throughput by performing a scheduling operation based on the Max C/I scheme, and guarantees the fairness by feeding back CQIs for only particular subcarriers. The scheme for feeding back CQIs for only particular subcarriers, i.e. a partial CQI feedback scheme, will be described in detail later.

Figure 1:
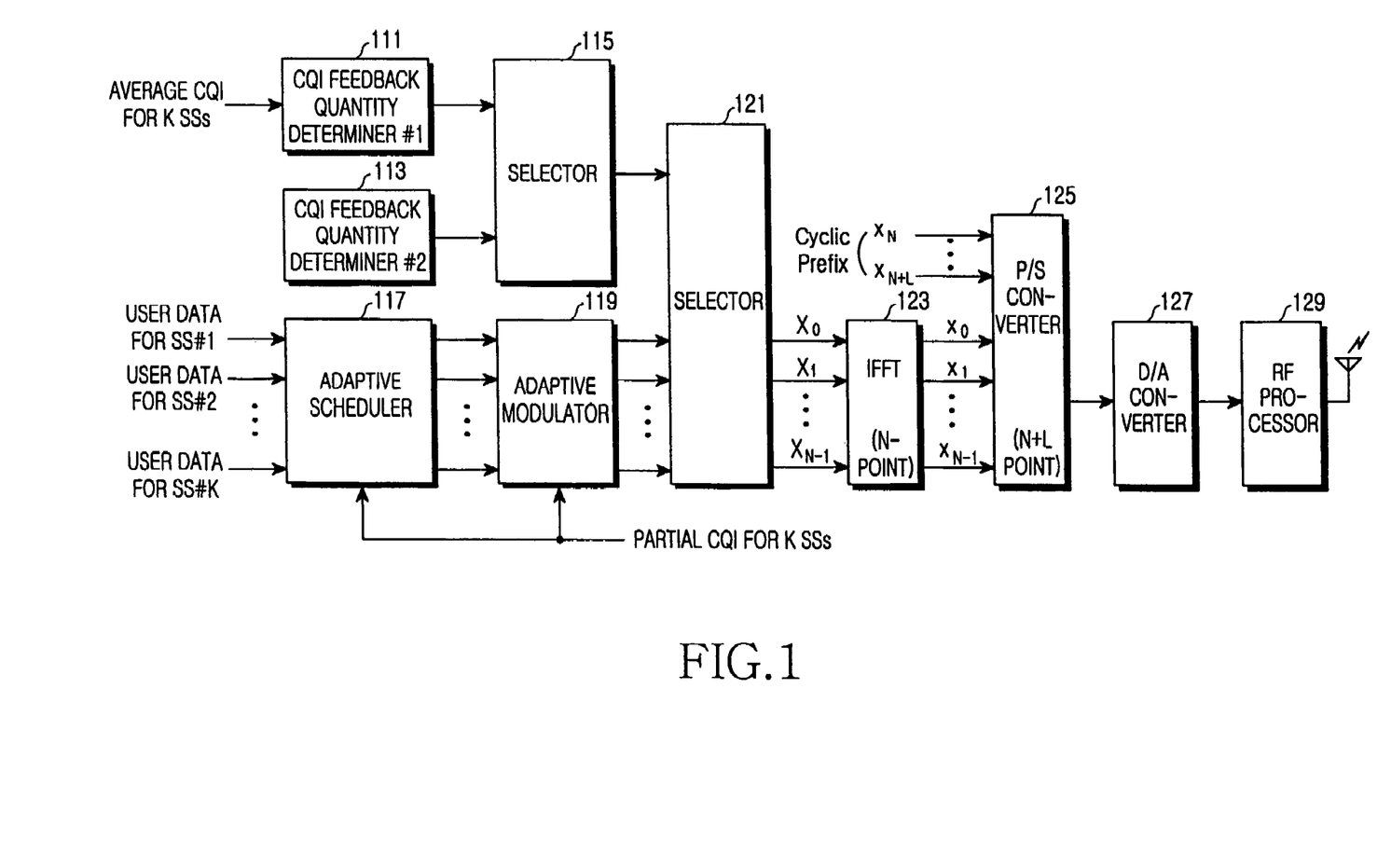
FIG. 1 is a block diagram illustrating a transmitter structure for an OFDMA communication system according to an embodiment of the present invention.

With reference to FIG. 1, a description will now be made of a transmitter structure for an OFDMA communication system according to an embodiment of the present invention. The transmitter of the OFDMA communication system will be described with reference to a base station (BS), and the receiver of the OFDMA communication system will be described with reference to an SS.

FIG. 1 is a block diagram illustrating a transmitter structure for an OFDMA communication system according to an embodiment of the present invention. Referring to FIG. 1, a transmitter, i.e. a BS, for the OFDMA communication system includes a first CQI feedback quantity determiner 111, a second CQI feedback quantity determiner 113, a selector 115, an adaptive scheduler 117, an adaptive modulator 119, a selector 121, an inverse fast Fourier transformer (IFFT) 123, a parallel-to-serial (P/S) converter 125, a digital-to-analog (D/A) converter 127, and a radio frequency (RF) processor 129.

User data for a plurality of, for example, K SSs of a first SS SS#1 to a $K^{th}$ SS #K to which the BS is providing a service, is input to the adaptive scheduler 117. A description will now be made of an operation of the adaptive scheduler 117.

The adaptive scheduler 117 performs a scheduling operation based on the Max C/I scheme. A conventional scheduler using the Max C/I scheme (Max C/I scheduler) allocates subcarriers such that each SS can feed back CQIs for all of the subcarriers (full CQI) and a BS can maximize throughput for each subcarrier by taking into consideration the full CQI fed back by the SS. The Max C/I scheduler selects an SS having the best channel state, i.e. the maximum C/I, for each subcarrier, and allocates a corresponding subcarrier to the selected SS.

However, the adaptive scheduler 117, unlike the conventional Max C/I scheduler, receives a partial CQI fed back from each SS, instead of a full CQI. Therefore, even though the adaptive scheduler 117 performs a scheduling operation based on the Max C/I scheme, it performs the scheduling operation in a different way from that of the conventional Max C/I scheduler.

(1) Rule 1: Contention-Based Scheduling Scheme Based on Partial CQI Feedback

The adaptive scheduler 117 performs a scheduling operation based on the partial CQI feedback. In the partial CQI feedback, all of the SSs feed back CQIs for the particular subcarriers instead of all of the subcarriers. For specific subcarriers, there exist CQIs fed back by particular SSs instead of all of the SSs. For the specific subcarriers, because there are CQIs fed back by only particular SSs as described above, the SSs that have fed back CQIs for the specific subcarriers are allocated the specific subcarriers on a needs basis.

In order for the adaptive scheduler 117 to perform a contention-based scheduling operation based on the partial CQI feedback, it is necessary to determine which SS from among all of the SSs should feed back CQIs and for how many subcarriers, and this depends upon the CQI feedback quantity decision operations of the first CQI feedback quantity determiner 111 and the second CQI feedback quantity determiner 113. The CQI feedback quantity decision operations of the first CQI feedback quantity determiner 111 and the second CQI feedback quantity determiner 113 will be described in detail later.

(2) Rule 2: Scheduling Scheme Based on Non-CQI Feedback

Because each SS performs a partial CQI feedback operation, for a specific subcarrier among the subcarriers for an OFDMA communication system, the adaptive scheduler 117 may fail to receive a CQI from any one of the SSs on a certain occasion. In this case, the adaptive scheduler 117 allocates the subcarrier, for which it has failed to receive a CQI from any SS, to a corresponding SS by the following two kinds of scheduling schemes.

A first scheduling scheme is a round-robin scheduling scheme. The round-robin scheduling scheme simply sequentially allocates the subcarriers to all of the SSs in a service area of a BS without any decision on channel states. Because the round-robin scheduling scheme sequentially allocates the subcarriers without considering the channel states of SSs as described above, this scheduling scheme suffers a loss in terms of the entire throughput of the OFDMA communication system, but it can guarantee a level of fairness by uniformly allocating the subcarriers to all of the SSs.

In this state, because the adaptive scheduler 117 has failed to receive a CQI from any one SS, the adaptive scheduler 117 performs a control operation such that the most robust modulation order among the modulation orders supported in the OFDMA communication system should be applied for a subcarrier allocated by the round-robin scheduling scheme taking into consideration an SS having the worst channel state.

A second scheduling scheme is an MF scheme. The MF scheme allocates subcarriers to an SS having the minimum throughput at present timing point. The MF scheme improves fairness by allocating a subcarrier, for which the adaptive scheduler 117 has failed to receive a CQI from any SS, to an SS having the minimum throughput at present timing point. Of course, the scheduling scheme in which the adaptive scheduler 117 allocates a subcarrier, for which it has failed to receive a CQI from any SS, can include various scheduling schemes in addition to the round-robin scheduling scheme and the MF scheme. The round-robin scheduling scheme and the MF scheme are given herein, by way of example.

After performing a scheduling operation on the first SS to the $K^{th}$ SS in the foregoing manner, i.e. after allocating the subcarriers of the OFDMA communication system to the first SS to the $K^{th}$ SS, the adaptive scheduler 117 outputs user data for the first SS to the $K^{th}$ SS to the adaptive modulator 119. The adaptive modulator 119 modulates the user data for the first SS to the $K^{th}$ SS with a modulation scheme corresponding to CQIs fed back from first SS to the $K^{th}$ SS, and outputs the modulated user data to the selector 121.

The adaptive modulator 119 modulates the user data for the first SS to the $K^{th}$ SS using a low-order modulation scheme such as Binary Phase Shift Keying (BPSK) scheme if the CQIs fed back from the first SS to the $K^{th}$ SS indicate a poor channel state. On the contrary, if the CQIs fed back from the first SS to the $K^{th}$ SS indicate a good channel state, the adaptive modulator 119 modulates the user data for the first SS to the $K^{th}$ SS using a high-order modulation scheme such as 16-ary Quadrature Amplitude Modulation (16-QAM) scheme.

The first CQI feedback quantity determiner 111 determines CQI feedback quantities by taking into consideration the channel states of the SSs, i.e. determines the CQI feedback quantities of the first SS to the $K^{th}$ SS depending on the CQIs fed back from the first SS to the $K^{th}$ SS, and then outputs the determined CQI feedback quantities of the first SS to the $K^{th}$ SS to the selector 115. A CQI feedback quantity decision operation of the first CQI feedback quantity determiner 111 will be described in detail later.

The second CQI feedback quantity determiner 113, unlike the first CQI feedback quantity determiner 111, determines the CQI feedback quantities of the first SS to the $K^{th}$ SS without by taking into consideration the channel states of the SSs, and then outputs the determined CQI feedback quantities of the first SS to the $K^{th}$ SS to the selector 115. A CQI feedback quantity decision operation of the second CQI feedback quantity determiner 113 will be described in detail later.

The selector 115 selects the CQI feedback quantities output from the first CQI feedback quantity determiner 111 and outputs the selected CQI feedback quantities to the selector 121, when the OFDMA communication system uses a scheme for determining the CQI feedback quantities of SSs by taking into consideration the channel states of the SSs. In contrast, when the OFDMA communication system uses a scheme for determining the CQI feedback quantities of the SSs without by taking into consideration the channel states of the SSs, the selector 115 selects the CQI feedback quantities output from the second CQI feedback quantity determiner 113, and outputs the selected CQI feedback quantities to the selector 121. The CQI feedback quantities for the SSs become a kind of control data.

The CQI feedback quantities for the SSs can be converted into control signals with one of the following two schemes by taking into consideration the feedback quantity of each of the SSs.

A first scheme converts CQI feedback quantities for respective SSs into different control signals for the respective SSs when the CQI feedback quantities for the respective SSs are significantly different from each other.

A second scheme, when CQI feedback quantities of respective SSs in a specific SS group are not significantly different from each other, i.e. similar to each other, converts the CQI feedback quantities for the respective SSs belonging to the SS group into control signals, and then groups the generated control signals into a final control signal. The final control signal is multicast to the SSs in the SS group through a kind of a multicast channel.

Of course, the selector 115 can use other schemes in addition to the foregoing 2 schemes, and because the control signal generation scheme is not directly related to the present invention, a description thereof will be omitted.

The selector 121 outputs the signal from the selector 115 to the IFFT 123 when a corresponding time interval is a time interval for transmitting control data (control data time interval), and outputs the signal from the adaptive modulator 119 to the IFFT 123 when a corresponding time interval is a time interval for transmitting user data (user data time interval). The IFFT 123 performs N-point IFFT on the signal output from the selector 121, and outputs the resultant signal to the P/S converter 125. The "control data" includes not only the CQI feedback quantities but also information related to the subcarriers allocated to respective SSs by the BS, i.e. scheduling information, and information related to the modulation schemes applied to the respective SSs.

The P/S converter 125 receives a Cyclic Prefix with a length L in addition to the signal output from the IFFT 123. The Cyclic Prefix is a guard interval signal, and is inserted to remove interference between an OFDM symbol transmitted at a previous OFDM symbol transmission time and an OFDM symbol transmitted at a current OFDM symbol transmission time in the OFDMA communication system. The guard interval signal is generated using one of a Cyclic Prefix scheme for copying a predetermined number of last samples of an OFDM symbol in a time domain and inserting the copied samples in a valid OFDM symbol, and a Cyclic Postfix scheme for copying a predetermined number of first samples of an OFDM symbol in a time domain and inserting the copied samples in a valid OFDM symbol. It is assumed in FIG. 1 that the guard interval signal is generated using the Cyclic Prefix scheme, and the guard interval signal generated using the Cyclic Prefix scheme is denoted by a Cyclic Prefix.

The P/S converter 125 serial-converts the signal output from the IFFT 123 and the Cyclic Prefix, and outputs the resultant signal to the D/A converter 127. The D/A converter 127 analog-converts the signal output from the P/S converter 125, and outputs the resultant signal to the RF processor 129. The RF process 129, includes a filter and a front-end unit, performs RF processing such that the signal output from the D/A converter 127 can be transmitted over the air, and transmits the RF-processed signal via an antenna.

With reference to FIG. 1, a description has been made of a transmitter structure for an OFDMA communication system according to an embodiment of the present invention. Next, with reference to FIG. 2, a description will be made of a receiver structure for an OFDMA communication system according to an embodiment of the present invention.

Figure 2:
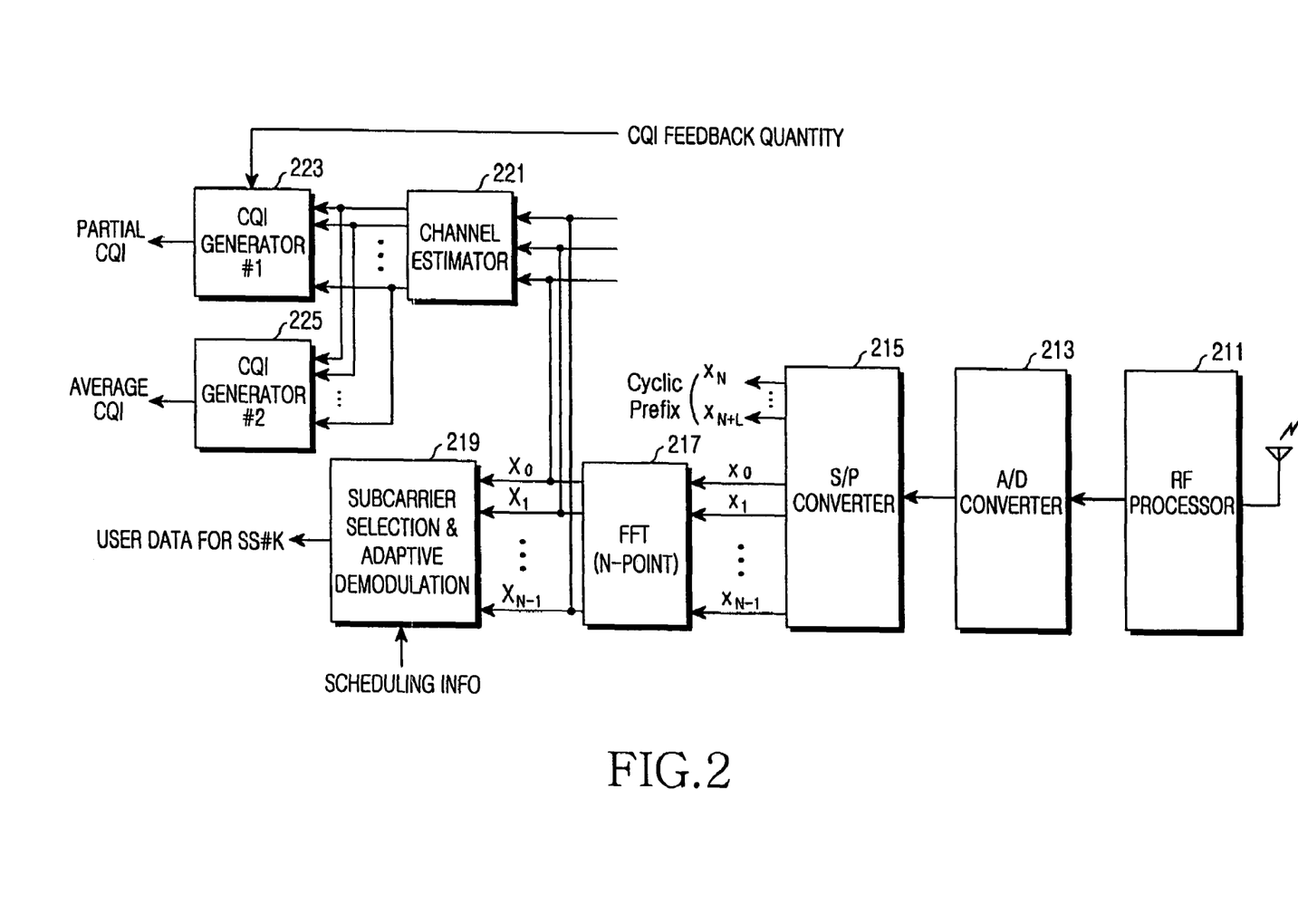
FIG. 2 is a block diagram illustrating a receiver structure for an OFDMA communication system according to an embodiment of the present invention.

FIG. 2 is a block diagram illustrating a receiver structure for an OFDMA communication system according to an embodiment of the present invention. Referring to FIG. 2, a receiver, i.e. an SS, for the OFDMA communication system includes an RF processor 211, an analog-to-digital (A/D) converter 213, a serial-to-parallel (S/P) converter 215, a fast Fourier transformer (FFT) 217, a subcarrier selection and adaptive demodulation unit 219, a channel estimator 221, a first CQI generator 223, and a second CQI generator 225.

A signal transmitted from a transmitter is received via an antenna of the SS. The transmitted signal experiences a multipath channel fading and includes a noise component incurred during its transmission. The signal received via the antenna is input to the RF processor 211, and the RF processor 211 down-converts the signal received via the antenna into an intermediate frequency (IF) band signal, and outputs the resultant signal to the A/D converter 213. The A/D converter 213 digital-converts the analog signal output from the RF processor 211 and outputs the resultant signal to the S/P converter 215.

The S/P converter 215 parallel-converts the signal output from the A/D converter 213 to remove a Cyclic Prefix of a length L, and outputs the resultant signal to the FFT 217. The FFT 217 performs N-point FFT on the signal output from the S/P converter 215, and outputs the resultant signal to the subcarrier selection and adaptive demodulation unit 219 and the channel estimator 221.

The subcarrier selection and adaptive demodulation unit 219 selects the subcarriers allocated to the SS from the signal output from the FFT 217 according to scheduling information received from the BS, and then demodulates the selected subcarriers into user data for the SS using a demodulation scheme corresponding to the modulation scheme used in the BS. Although not separately illustrated in FIG. 2, control data transmitted from the transmitter is received in a control data time interval, and the subcarrier selection and adaptive demodulation unit 219 operates according to scheduling information and modulation scheme information in the received control data.

The channel estimator 221 performs channel estimation on the signal output from the FFT 217, and outputs a channel estimation value to the first CQI generator 223 and the second CQI generator 225. For example, the channel estimator 221 estimates a channel state for every subcarrier for the OFDMA communication system using a reference signal or data such as a pilot signal, and outputs the channel estimation value to the first CQI generator 223 and the second CQI generator 225. The "channel estimation value" refers to a C/I, by way of example.

The first CQI generator 223 generates a partial CQI according to the channel estimation value for every subcarrier for the OFDMA communication system, output from the channel estimator 221, and a CQI feedback quantity received from the BS. A partial CQI generation operation of the first CQI generator 223 will be described in detail later.

The second CQI generator 225 calculates an average of channel estimation values, i.e. C/Is, for all of the subcarriers for the OFDMA communication system, received from the channel estimator 221, and generates an average CQI using the average channel estimation value. For example, the second CQI generator 225 calculates the average channel estimation value by arithmetic-averaging or geometric-averaging the channel estimation values for all of the subcarriers for the OFDMA communication system. An average CQI generation operation of the second CQI generator 225 will be described in detail later.

The SS, although not separately illustrated in FIG. 2, selects a partial CQI generated by the first CQI generator 223 if a CQI feedback scheme used in the OFDMA communication system is a partial CQI feedback scheme, and selects an average CQI generated by the second CQI generator 225 if the CQI feedback scheme is an average CQI feedback scheme, and then feeds back the selected CQI to the BS.

With reference to FIG. 2, a description has been made of a receiver structure for an OFDMA communication system according to an embodiment of the present invention. Next, with reference to FIG. 3, a description will be made of an internal structure of the first CQI feedback quantity determiner 111 of FIG. 1.

Figure 3:
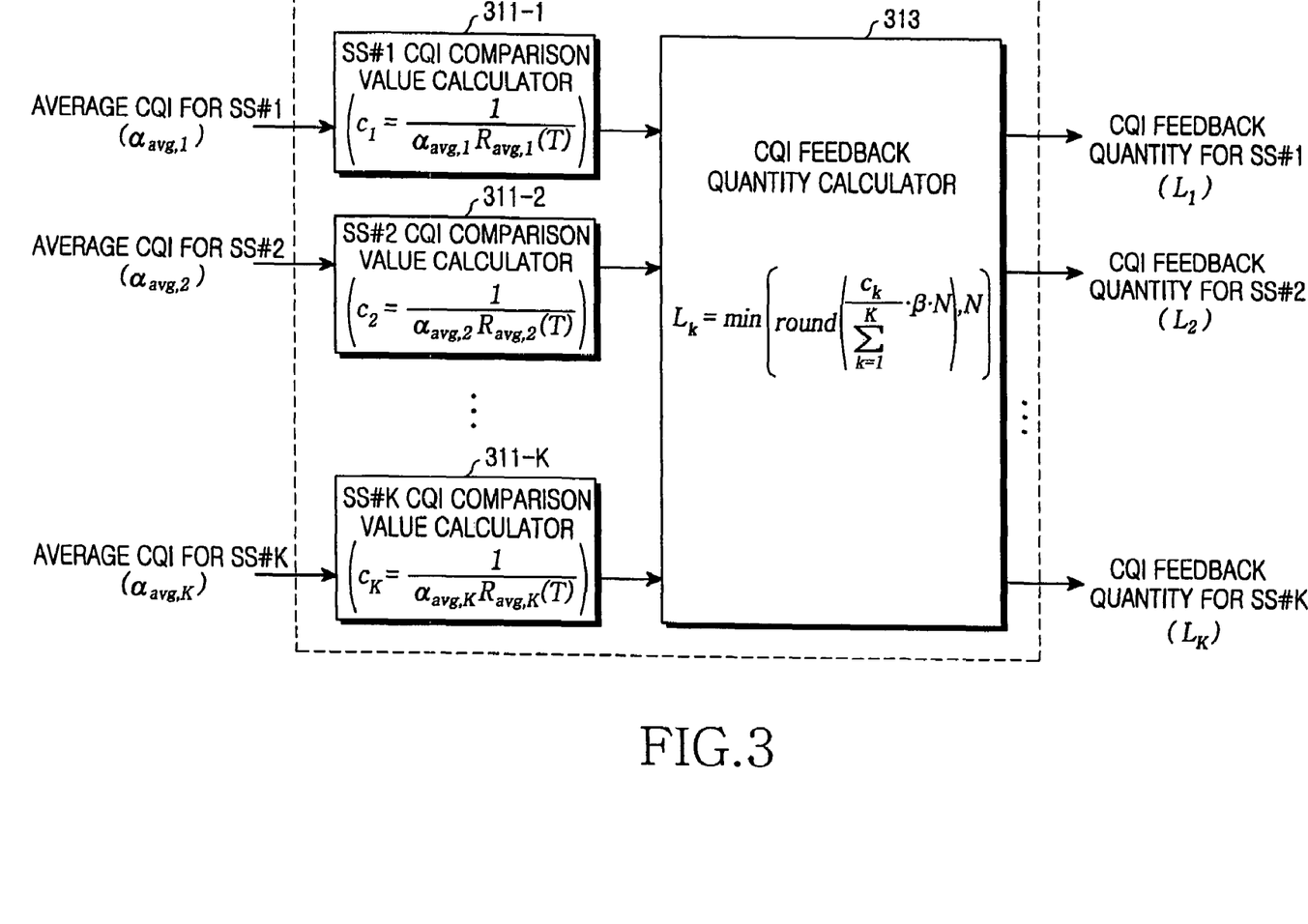
FIG. 3 is a block diagram illustrating an internal structure of the first CQI feedback quantity determiner 111 of FIG. 1.

FIG. 3 is a block diagram illustrating an internal structure of the first CQI feedback quantity determiner 111 of FIG. 1. Referring to FIG. 3, the first CQI feedback quantity determiner 111 includes K comparison value calculators of a first-SS (SS#1) comparison value calculator 311-1 to a $K^{th}$-SS (SS#K) comparison value calculator 311-K, and a CQI feedback quantity calculator 313. If an average CQI for a particular SS, e.g. a $k^{th}$ SS, among K SSs is expressed by $\alpha_{avg,k}$, the SS#1 comparison value calculator 311-1 to the SS#K comparison value calculator 311-K each calculate a comparison value $c_k$ in accordance with Equation (1). The reason why the SS#1 comparison value calculator 311-1 to the SS#K comparison value calculator 311-K each calculate a comparison value $c_k$ by taking into consideration the average CQI $\alpha_{avg,k}$ is because the first CQI feedback quantity determiner 111 determines the CQI feedback quantities by taking into consideration channel states of respective SSs.

$$c_k = \frac{1}{\alpha_{avg,k} R_{avg,k}(T)} \quad (1)$$

In Equation (1), $c_k$ denotes a comparison value for a $k^{th}$ SS, $R_{avg,k}(T)$ denotes a quantity of data that a $k^{th}$ SS receives on average for a particular time interval T, and the time interval T is a variable set according to the situation of the OFDMA communication system. The average received data quantities for all of the SSs of a BS are initialized to '1' as shown in Equation (2).

$$R_{avg,k}(0)=1, k=1,2,\ldots,K \quad (2)$$

Because a BS cannot recognize average received data quantities for all of its SSs at initial communication, the BS equally initializes the average received data quantities for all of its SSs to '1' as shown in Equation (2).

If the BS performs an actual communication after equally initializing the average received data quantities for all of the SSs to '1' as shown in Equation (2), the average received data quantities for all of the SSs are updated as shown in Equation (3).

$$R_{avg,k}(T) = \left(1 - \frac{1}{T_W}\right) \cdot R_{avg,k}(T-1) + \frac{1}{T_W} \cdot D_k(T), k = 1, 2, \ldots, K \quad (3)$$

In Equation (3), $D_k(T)$ denotes a quantity of data that a $k^{th}$ SS receives in a time interval T, and $T_W$ denotes a time interval for which an average of quantities of data that the $k^{th}$ SS receives is calculated. The $T_W$ indicating a time interval for which an average of the quantities of the data that the $k^{th}$ SS receives is calculated is generally set to a very long time interval.

In Equation (1), the reason for calculating the comparison value $c_k$ for a $k^{th}$ SS in an inverse proportion to the average CQI $\alpha_{avg,k}$ for the $k^{th}$ SS and the quantity $R_{avg,k}(T)$ of data that the $k^{th}$ SS receives on average for a particular time interval T is to increase fairness between the SSs. That is, the BS assigns higher priorities to an SS having a poor channel state and an SS having a low average received data quantity in a scheduling operation, thereby increasing fairness between the SSs.

Once the respective comparison values for the first SS to the $K^{th}$ SS are calculated in the foregoing manner, the CQI feedback quantity calculator 313 calculates a CQI feedback quantity for a $k^{th}$ SS in accordance with Equation (4).

$$L_k = \min(\text{round}(\frac{c_k}{\sum_{k=1}^{K} c_k} \cdot \beta \cdot N), N) \quad (4)$$

In Equation (4), $L_k$ denotes a CQI feedback quantity for a $k^{th}$ SS, a min ( ) function is a function of selecting a minimum value between round $$\left( \frac{c_k}{\sum_{k=1}^{K} c_k} \cdot \beta \cdot N \right)$$

and N. N denotes the total number of subcarriers for the OFDMA communication system. A round ( ) function is a function of generating a corresponding value into an integer most approximating the corresponding value, and β denotes a weight to be applied to a full CQI feedback quantity for all of the SSs or an average between CQI feedback quantities for all of the SSs. Herein, the reason for selecting the minimum value between round $$\left( \frac{c_k}{\sum_{k=1}^{K} c_k} \cdot \beta \cdot N \right)$$

and N using the min( ) function is because the maximum number of subcarriers, for which the $k^{th}$ SS feeds back CQIs, cannot exceed N.

The weight β is a variable set according to the situation of the OFDMA communication system, and a method of setting the weight β is roughly divided into the following two schemes.

(1) Scheme 1: Full CQI Feedback Quantity Fixed

If the full CQI feedback quantity is defined as $L_{total}$, the weight β is calculated in accordance with Equation (5).

$$\beta = \frac{L_{total}}{N} \quad (5)$$

(2) Scheme 2: Average CQI Feedback Quantity Fixed

If the average CQI feedback quantity is defined as $L_{avg}$, the weight β is calculated in accordance with Equation (6).

$$\beta = \frac{L_{avg} K}{N} \quad (6)$$

With reference to FIG. 3, a description has been made of an internal structure of the first CQI feedback quantity determiner 111 of FIG. 1. Next, with reference to FIG. 4, a description will be made of an internal structure of the second CQI feedback quantity determiner 113 of FIG. 1.

Figure 4:
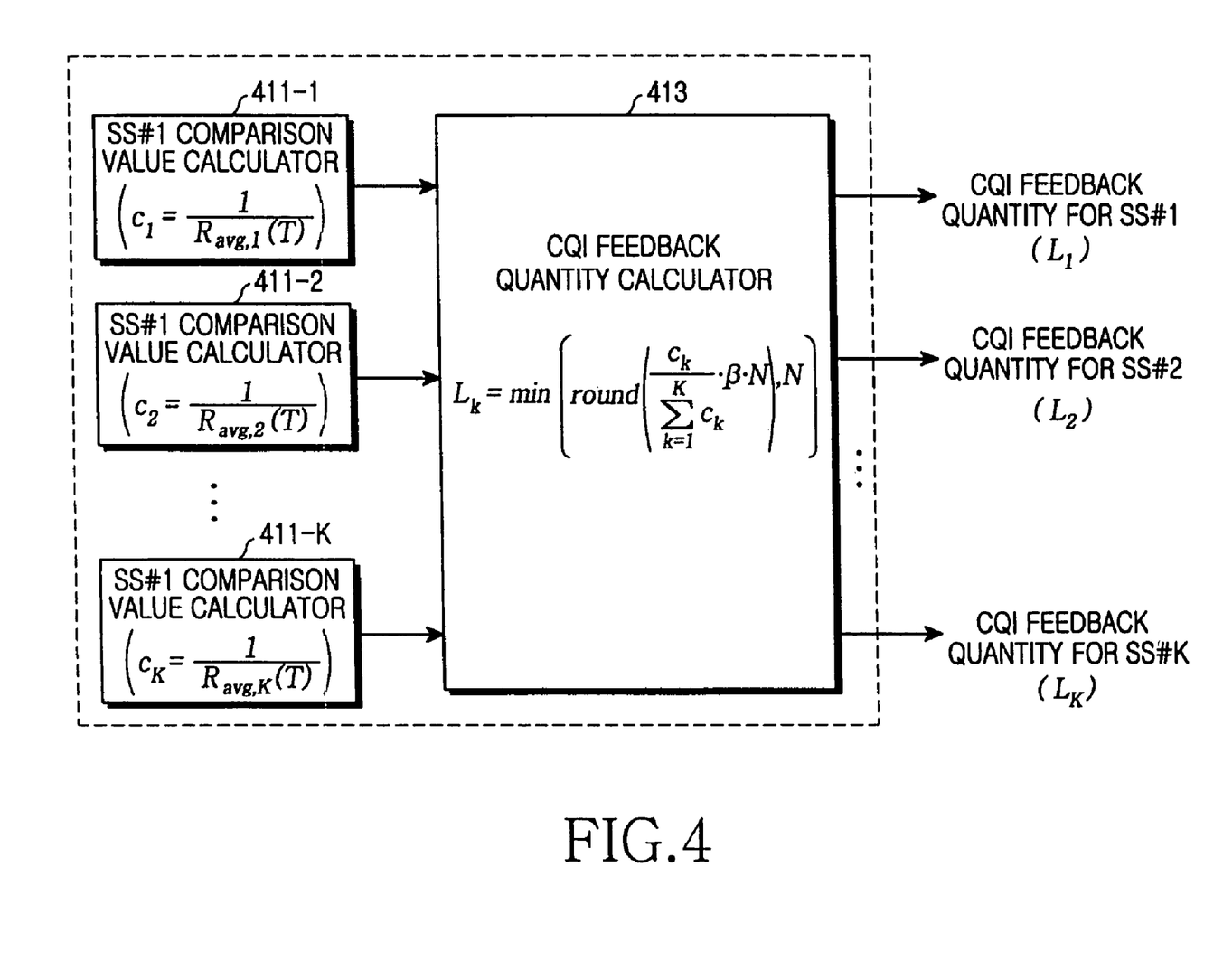
FIG. 4 is a block diagram illustrating an internal structure of the second CQI feedback quantity determiner of FIG. 1.

FIG. 4 is a block diagram illustrating an internal structure of the second CQI feedback quantity determiner 113 of FIG. 1. Referring to FIG. 4, the second CQI feedback quantity determiner 113 includes K comparison value calculators of a first-SS (SS#1) comparison value calculator 411-1 to a $K^{th}$-SS (SS#K) comparison value calculator 411-K, and a CQI feedback quantity calculator 413. The second CQI feedback quantity determiner 113 determines the CQI feedback quantities for the respective SSs without taking into consideration the channel states of the respective SSs. Compared with the first CQI feedback quantity determiner 111 that determines the CQI feedback quantities by taking into consideration the channel states, the second CQI feedback quantity determiner 113 can minimize uplink load and uplink interference due to the CQI feedback from the respective SSs, thus being suitable for actual communication.

A CQI feedback quantity decision operation of the second CQI feedback quantity determiner 113 is almost equal to the CQI feedback quantity decision operation of the first CQI feedback quantity determiner 111, except that the average CQIs $\alpha_{avg,k}$ are not used for calculation of the comparison values $c_k$. The reason why the second CQI feedback quantity determiner 113 does not use the average CQIs $\alpha_{avg,k}$ for calculation of the comparison values $c_k$ is because the second CQI feedback quantity determiner 113 determines the CQI feedback quantities without taking into consideration the channel states of the respective SSs as described above. Each of the SS#1 comparison value calculator 411-1 to the SS#K comparison value calculator 411-K each calculates a comparison value $c_k$ in accordance with Equation (7).

$$c_k = \frac{1}{R_{avg,k}(T)} \quad (7)$$

The CQI feedback quantity decision operation of the second CQI feedback quantity determiner 113 is equal to the CQI feedback quantity decision operation of the first CQI feedback quantity determiner 111, except that the SS#1 comparison value calculator 411-1 to the SS#K comparison value calculator 411-K each calculate the comparison value $c_k$ without taking into consideration the average CQIs $\alpha_{avg,k}$ as shown in Equation (7). Therefore, a description of the remaining CQI feedback quantity decision operation of the second CQI feedback quantity determiner 113 will be omitted.

As a result, because the second CQI feedback quantity determiner 113 can determine the CQI feedback quantities for the respective SSs without determining the channel states of the respective SSs as described with reference to FIG. 4, the SSs are not necessarily required to feed back CQIs indicating the channel states, contributing to minimization of uplink load and uplink interference due to the CQI feedback of the respective SSs.

With reference to FIG. 4, a description has been made of an internal structure of the second CQI feedback quantity determiner 113 of FIG. 1. Next, with reference to FIG. 5, a description will be made of an internal structure of the first CQI generator 223 of FIG. 2.

Figure 5:
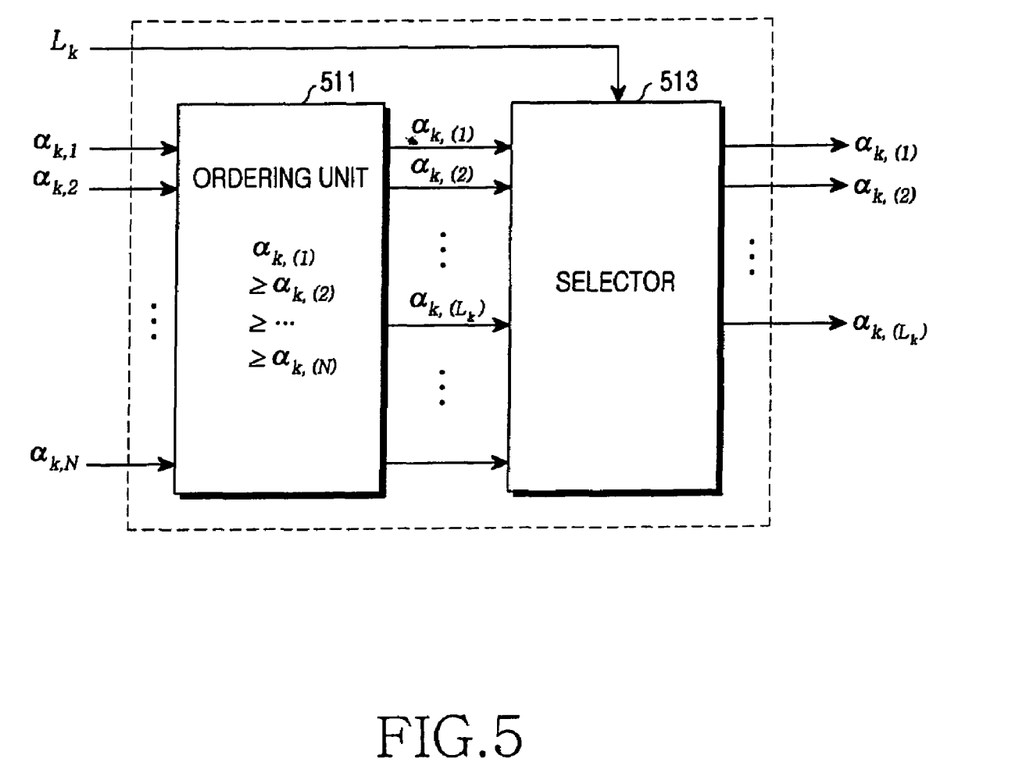
FIG. 5 is a block diagram illustrating an internal structure of the first CQI generator of FIG. 2.

FIG. 5 is a block diagram illustrating an internal structure of the first CQI generator 223 of FIG. 2. Referring to FIG. 5, the first CQI generator 223 of FIG. 2 includes an ordering unit 511 and a selector 513.

It will be assumed that channel estimation values for respective subcarriers for a particular SS, e.g. a $k^{th}$ SS, output from the channel estimator 221, i.e. CQIs for a first subcarrier to an $N^{th}$ subcarrier, are defined as $\alpha_{k,1}$ to $\alpha_{k,N}$, i.e. $\alpha_{k,1}$, $\alpha_{k,2}, \ldots, \alpha_{k,N-1}, \alpha_{k,N}$. The CQIs $\alpha_{k,1}, \alpha_{k,2}, \ldots, \alpha_{k,N-1}, \alpha_{k,N}$ for the first subcarrier to the $N^{th}$ subcarrier, output from the channel estimator 221, are input to the ordering unit 511.

The ordering unit 511 orders the CQIs $\alpha_{k,1}, \alpha_{k,2}, \ldots, \alpha_{k,N-1}$, $\alpha_{k,N}$ for the first subcarrier to the $N^{th}$ subcarrier, output from the channel estimator 221, in size order, and outputs the result to the selector 513. It will be assumed in FIG. 5 that a CQI $\alpha_{k,1}$ for the first subcarrier has the maximum size, a CQI $\alpha_{k,2}$ for the second subcarrier has the second maximum size, and in this way, a CQI $\alpha_{k,N}$ for the $N^{th}$ subcarrier has the minimum size ($\alpha_{k,1} \geq \alpha_{k,2} \geq \ldots \geq \alpha_{k,N-1} \geq \alpha_{k,N} \geq$).

The selector 513 selects a predetermined number of the subcarriers, i.e. as many subcarriers as the number corresponding to $L_k$ which is a CQI feedback quantity for a $k^{th}$ SS, among CQIs for a total of N subcarriers which were ordered by the ordering unit 511 in size order, and outputs only the selected $L_k$ CQIs $\alpha_{k,1}, \alpha_{k,2}, \ldots, \alpha_{k,L_k}$. The reason why the selected $L_k$ CQIs are ($\alpha_{k,1}, \alpha_{k,2}, \ldots, \alpha_{k,L_k}$ is because it is assumed that a CQI for the first subcarrier has the maximum value, a CQI for the second subcarrier has the second maximum value, and in this way, a CQI for the $N^{th}$ subcarrier has the minimum value as described above.

The reason that the selector 513 selects $L_k$ CQIs determined for the $k^{th}$ SS in size order is because the adaptive scheduler 117 is based on the Max C/I scheme. Because the adaptive scheduler 117 allocates subcarriers to the corresponding SSs using the Max C/I scheme, the adaptive scheduler 117 requires the CQIs for only the subcarriers having good channel states. In other words, for each subcarrier, because the adaptive scheduler 117 allocates the subcarrier to an SS having the best channel state based on the Max C/I scheme, the SS allocated the subcarrier has a good channel state, i.e. a larger CQI. Due to the foregoing scheduling characteristic of the adaptive scheduler 117, it is preferable not to transmit the CQIs for the subcarriers having poor channel states in terms of uplink load and uplink interference.

With reference to FIG. 5, a description has been made of an internal structure of the first CQI generator 223 of FIG. 2. Next, with reference to FIG. 6, a description will be made of a scheduling and signal transmission operation of a transmitter, i.e. a BS, for the OFDMA communication system.

Figure 6:
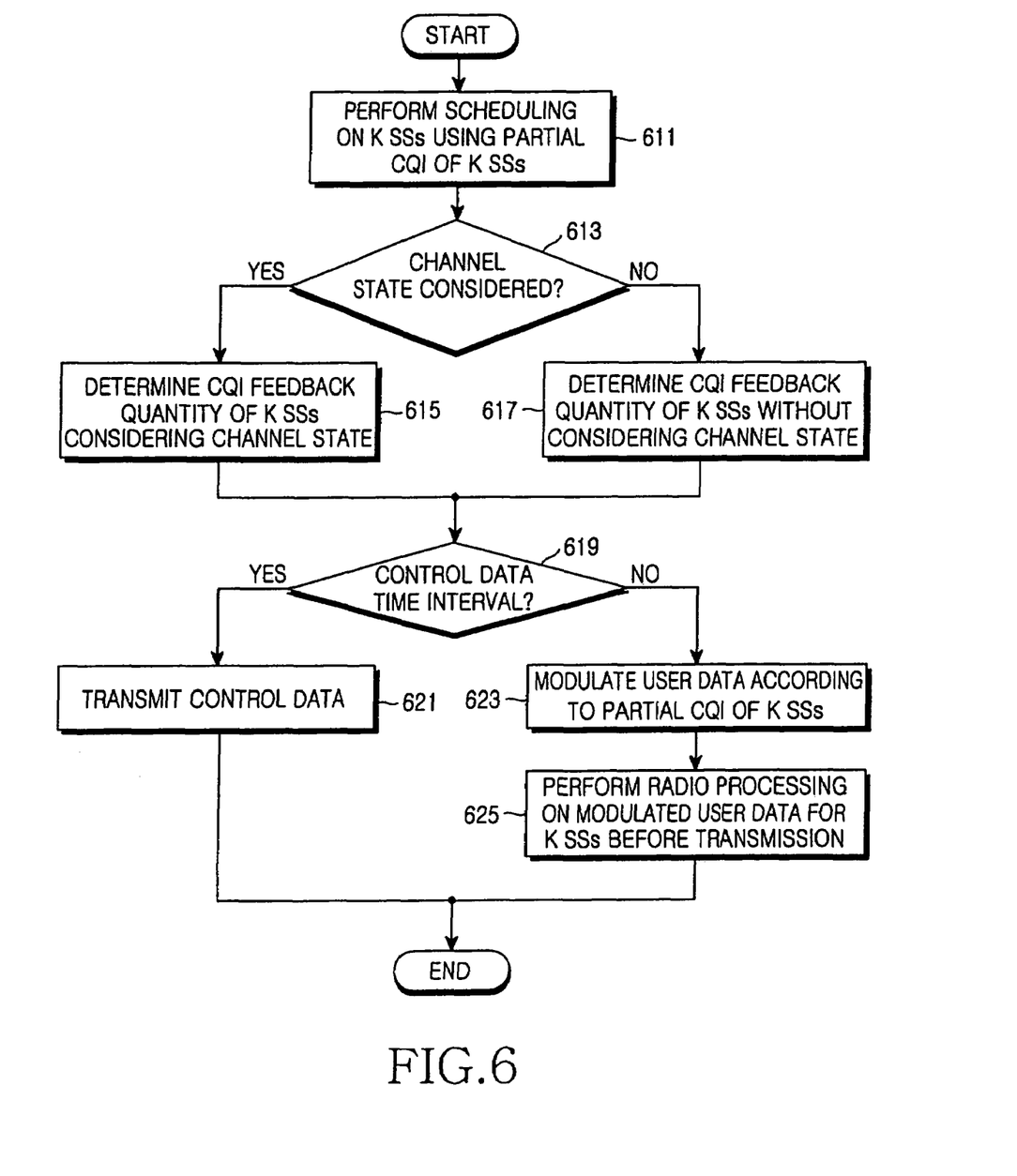
FIG. 6 is a flowchart illustrating a scheduling and signal transmission operation of a transmitter for an OFDMA communication system according to an embodiment of the present invention.

FIG. 6 is a flowchart illustrating a scheduling and signal transmission operation of a transmitter for an OFDMA communication system according to an embodiment of the present invention. Referring to FIG. 6, in step 611, a transmitter, i.e. a BS, for the OFDMA communication system performs scheduling on each of the K SSs based on the Max C/I scheme using the partial CQIs fed back from the K SSs, and then proceeds to step 613. The operation of performing scheduling on each of the K SSs is an operation of the allocating subcarriers for transmitting the user data for each of the K SSs, and is equal to the scheduling operation described in connection with FIG. 1.

In step 613, the BS checks if it will determine the CQI feedback quantities by taking into consideration the channel states. The BS determines the CQI feedback quantities by taking into consideration the channel states if the CQI feedback quantity decision scheme is set to a scheme for determining the CQI feedback quantities by taking into consideration the channel states in the OFDMA communication system, and determines the CQI feedback quantities without by taking into consideration the channel states if the CQI feedback quantity decision scheme is set to a scheme for determining the CQI feedback quantities without by taking into consideration the channel states in the OFDMA communication system.

That is, the BS determines the CQI feedback quantities using the first CQI feedback quantity determiner 111 if the CQI feedback quantity decision scheme is set to the scheme for determining the CQI feedback quantities by taking into consideration the channel states in the OFDMA communication system, and determines CQI feedback quantities using the second CQI feedback quantity determiner 113 if the CQI feedback quantity decision scheme is set to the scheme for determining the CQI feedback quantities without by taking into consideration the channel states in the OFDMA communication system.

If it is determined in step 613 that the BS will determine the CQI feedback quantities by taking into consideration the channel states, the BS determines the CQI feedback quantities for each of the K SSs by taking into consideration the channel states in step 615, and then proceeds to step 619. However, if it is determined in step 613 that the BS will determine the CQI feedback quantities without by taking into consideration the channel states, the BS determines the CQI feedback quantities for each of the K SSs without by taking into consideration the channel states in step 617, and then proceeds to step 619.

In step 619, the BS determines if a current time interval is a control data time interval. If it is determined that the current time interval is the control data time interval, the BS transmits in step 621 control data including the determined CQI feedback quantities, scheduling information and modulation scheme information.

However, if it is determined in step 619 that the current time interval is not the control data time interval, i.e. the current time interval is a user data time interval, then the BS modulates user data for each of the K SSs using a modulation scheme corresponding to the partial CQIs for the K SSs in step 623. Thereafter, in step 625, the BS performs radio processing, i.e. IFFT operation, P/S conversion, D/A conversion and RF processing on the modulated user data for each of the K SSs, transmits the radio-processed signal, and then ends its operation.

With reference to FIG. 6, a description has been made of a scheduling and signal transmission operation of a transmitter for an OFDMA communication system according to an embodiment of the present invention. Next, with reference to FIG. 7, a description will be made of a signal reception and CQI generation operation of a receiver for an OFDMA communication system according to an embodiment of the present invention.

Figure 7:
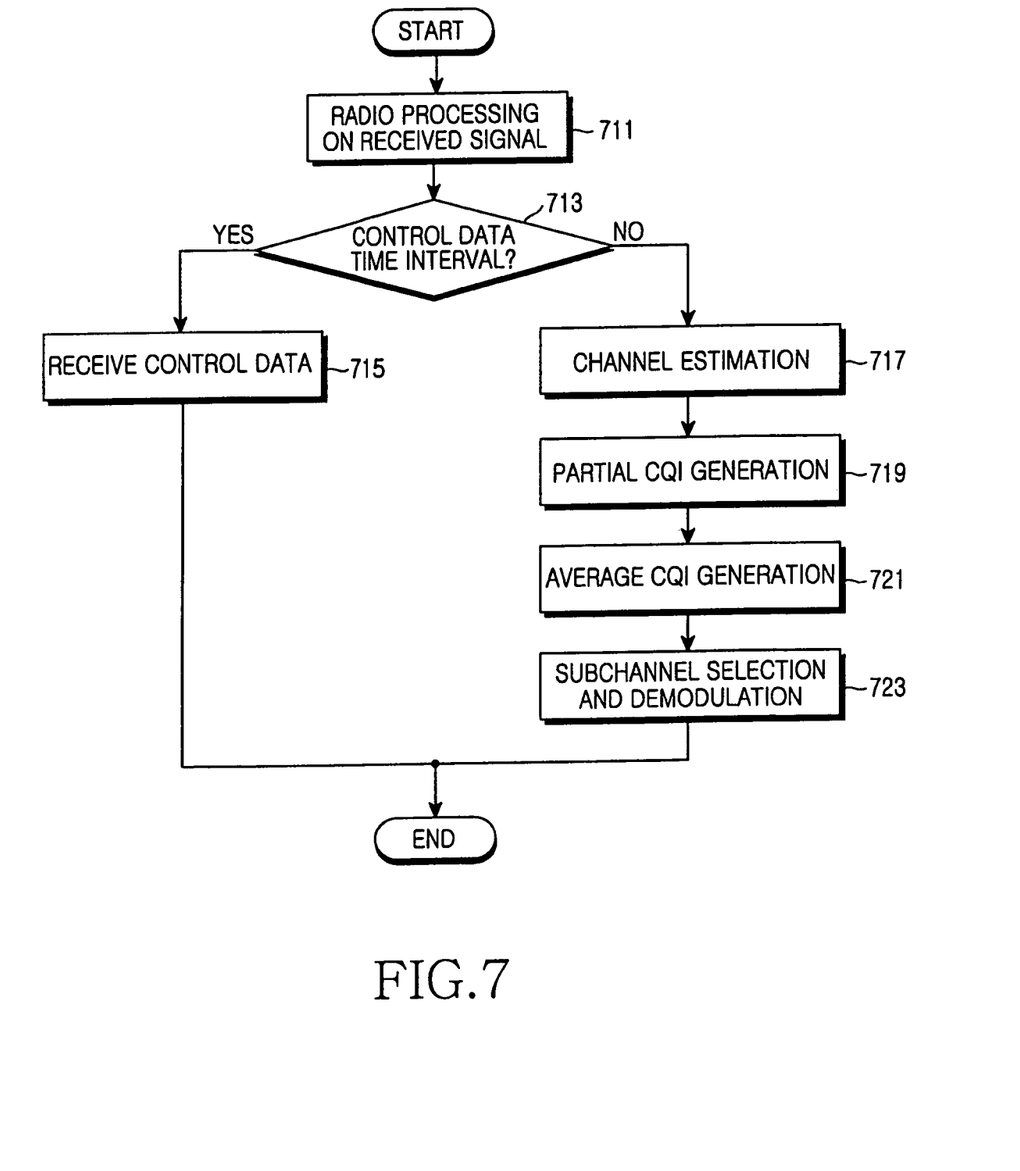
FIG. 7 is a flowchart illustrating a signal reception and CQI generation process of a receiver for an OFDMA communication system according to an embodiment of the present invention.

FIG. 7 is a flowchart illustrating a signal reception and the CQI generation process of a receiver for an OFDMA communication system according to an embodiment of the present invention. Referring to FIG. 7, in step 711, a receiver, i.e. an SS, for the OFDMA communication system receives a signal, and performs radio processing on the received signal. The operation of performing radio processing on the received signal indicates an operation of performing the down-conversion to an IF band, A/D conversion, S/P conversion and FFT operation on the received signal. In step 713 the SS determines if a current time interval is a control data time interval. If it is determined that the current time interval is the control data time interval, the SS receives in step 715 control data including the CQI feedback quantities, scheduling information and modulation scheme information, and then ends its operation.

However, if it is determined in step 713 that the current time interval is not the control data time interval, i.e. the current time interval is not the user data time interval, then the SS channel-estimates the radio-processed received signal to estimate a C/I for each subcarrier in step 717. Thereafter, in step 719, the SS generates a partial CQI according to CQI feedback quantities included in previously received control data, and then proceeds to step 721. The process of generating a partial CQI is equal to the partial CQI generation process described with reference to FIG. 5. In step 721, the SS generates an average CQI by averaging the C/Is for respective subcarriers. In step 723, the SS selects subcarriers according to scheduling information included in the control data and demodulates the selected subcarrier signal according to modulation scheme information included in the control data to restore the subcarrier signal to original user data.

As can be understood from the foregoing description, the present invention performs scheduling based on a Max C/I scheme using CQIs fed back for only particular subcarriers in a multicarrier communication system, thereby maintaining a level of fairness between the SSs, maximizing throughput, and minimizing complexity. Advantages of the present invention are summarized below.

(1) Minimization of CQI Feedback Quantity

As a communication system evolves into a multicarrier communication system, the CQI feedback for the multiple carriers functions as uplink load and uplink interference. The CQI feedback quantity can be reduced by feeding back a partial CQI proposed by the present invention.

(2) Minimization of Scheduling Complexity

Scheduling complexity is important in a multicarrier communication system, because it is related to the cost of the devices. Particularly, in the multicarrier communication system, the use of the MF scheme and the PF scheme, which are conventional scheduling schemes, increases in the scheduling complexity by geometric progression, disabling their implementation. Therefore, there is no choice but to use the Max C/I scheme having the minimum complexity. However, in the multicarrier communication system in which the Max C/I scheme is used, feeding back of a full CQI reduces the level of fairness between users undesirably. Therefore, the present invention performs scheduling based on the Max C/I scheme by feeding back a partial CQI, thereby guaranteeing throughput while increasing fairness between users.

(3) Harmony between Entire Throughput and Fairness Between Users

In an actual communication system, it is not possible to disregard the fairness between users to maximize the entire throughput, and vice versa. Therefore, a scheduling scheme that considers both the entire throughput and the fairness between users, which have the opposite characteristics, has the highest scheduling efficiency, and the adaptive scheduling scheme proposed by the present invention considers both the entire throughput and the fairness between users and has excellent performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A scheduling method of a transmitter which communicates with K receivers, for a multicarrier communication system using N subcarriers, the method comprising the steps of:
  (a) determining a respective channel quality information (CQI) feedback quantity that is indicative of the number of subcarriers for which CQIs will be fed back from among the N subcarriers, for each of the K receivers;
  (b) transmitting the determined CQI feedback quantities to the K receivers, respectively;
  (c) receiving CQIs, corresponding to the determined CQI feedback quantities, fed back from the K receivers, respectively;
  (d) allocating subcarriers for which there are CQIs fed back from at least one receiver among the K receivers among the N subcarriers, to any one receiver among the receivers that have fed back CQIs; and
  (e) allocating subcarriers for which there is no CQI fed back from any receiver among the K receivers among the N subcarriers, to a receiver having minimum throughput at a present timing point among the K receivers,
  wherein the received CQIs include a partial CQI, when a CQI feedback scheme used in the multicarrier communication system is a partial CQI feedback scheme, and the partial CQI includes CQIs for particular subcarriers among the CQIs for the N subcarriers,
  wherein the received CQIs include an average CQI, when the CQI feedback scheme is an average CQI feedback scheme, and the average CQI is generated by averaging the CQIs for the N subcarriers, and
  wherein step (d) comprises allocating subcarriers for which there are CQIs fed back from at least one receiver among the K receivers, to a receiver that has fed back a CQI indicating the best channel state.

2. The scheduling method of claim 1, further comprising the step of randomly allocating subcarriers for which there is no CQI fed back from any receiver among the K receivers among the N subcarriers, to an arbitrary receiver among the K receivers.

3. The scheduling method of claim 1, wherein step (a) comprises the step of determining the respective CQI feedback quantity based on at least one of channel states and reception throughputs of each of the K receivers.

4. A method for feeding back channel quality information (CQI) by a receiver, for a multicarrier communication system using N subcarriers, the method comprising the steps of:
  (a) receiving, from a transmitter, a CQI feedback quantity determined by the transmitter for the receiver and indicating the number of subcarriers for which CQIs will be fed back from among the N subcarriers;
  (b) detecting CQIs for the N subcarriers by channel-estimating a signal received from the transmitter; and
  (c) generating a CQI to be transmitted to the transmitter, and transmitting the CQI to the transmitter,
  wherein the CQI includes a partial CQI, when a CQI feedback scheme used in the multicarrier communication system is a partial CQI feedback scheme, and the partial CQI is generated by selecting a number of CQIs equal to the CQI feedback quantity among the CQIs for the N subcarriers, and
  wherein the CQI includes an average CQI, when the CQI feedback scheme is an average CQI feedback scheme, and the average CQI is generated by averaging the CQIs for the N subcarriers, and
  wherein step (c) comprises:
  sequentially ordering the CQIs for the N subcarriers in order of a CQI indicating the best channel state to a CQI indicating the worst channel state; and
  selecting as many CQIs as a number corresponding to the CQI feedback quantity from the CQIs indicating the best channel quality.

5. The method of claim 4, wherein averaging the CQIs for the N subcarriers comprises arithmetic-averaging the CQIs for the N subcarriers.

6. The method of claim 4, wherein averaging the CQIs for the N subcarriers comprises geometric-averaging the CQIs for the N subcarriers.

7. A scheduling method for a multicarrier communication system using N subcarriers, in which a transmitter communicates with K receivers, the method comprising the steps of:
  (a) determining, by the transmitter, a respective channel quality information (CQI) feedback quantity indicative of the number of subcarriers for which CQIs will be fed back among the N subcarriers, for each of the K receivers, and transmitting the determined CQI feedback quantities to the K receivers, respectively;

(b) receiving, by the K receivers, the determined CQI feedback quantities from the transmitter, respectively, and detecting CQIs for the N subcarriers by channel-estimating a signal received from the transmitter;

(c) generating, by each of the K receivers, a CQI to be fed back to the transmitter, and feeding back the CQI to the transmitter;

(d) upon the transmitter's receiving CQIs corresponding to the respective CQI feedback quantity, fed back from the each of the K receivers, allocating subcarriers for which there are CQIs fed back from at least one receiver among the K receivers among the N subcarriers, to any one receiver among the receivers that have fed back CQIs; and (e) allocating subcarriers for which there is no CQI fed back from any receiver among the K receivers among the N subcarriers, to a receiver having minimum throughput at a present timing point among the K receivers, wherein the CQI includes a partial CQI, when a CQI feedback scheme used in the multicarrier communication system is a partial CQI feedback scheme, and the partial CQI is generated by selecting a number of CQIs equal to the CQI feedback quantity among the CQIs for the N subcarriers, wherein the CQI includes an average CQI, when the CQI feedback scheme is an average CQI feedback scheme, and the average CQI is generated by averaging the CQIs for the N subcarriers, and wherein step (d) comprises allocating subcarriers for which there are CQIs fed back from at least one receiver from the K receivers, to a receiver that has fed back a CQI indicating the best channel state.

8. The scheduling method of claim 7, wherein the step (c) comprises the steps of:

sequentially ordering the CQIs for the N subcarriers in order of a CQI indicating the best channel state to a CQI indicating the worst channel state; and selecting as many CQIs as a number corresponding to the respective CQI feedback quantity from the CQIs indicating the best channel quality.

9. The scheduling method of claim 7, wherein averaging the CQIs for the N subcarriers comprises arithmetic-averaging the CQIs for the N subcarriers.

10. The scheduling method of claim 7, wherein averaging the CQIs for the N subcarriers comprises geometric-averaging the CQIs for the N subcarriers.

11. The scheduling method of claim 7, further comprising the step of randomly allocating, by the transmitter, subcarriers for which there is no CQI fed back from any receiver among the K receivers among the N subcarriers, to an arbitrary predetermined receiver among the K receivers.

12. The scheduling method of claim 7, wherein the step (a) comprises the step of determining the respective CQI feedback quantity based on at least one of channel states and reception throughputs of each of the K receivers.

13. A scheduling apparatus of a transmitter which communicates with K receivers, for a multicarrier communication system using N subcarriers, the apparatus comprising:

a channel quality information (CQI) feedback quantity determiner for determining a respective CQI feedback quantity indicative of the number of subcarriers for which CQIs will be fed back among the N subcarriers, for each of the K receivers;

a reception part for receiving CQIs corresponding to the determined CQI feedback quantities, fed back from the K receivers, respectively;

a scheduler for allocating subcarriers for which there are CQIs fed back from at least one receiver among the K receivers among the N subcarriers, to any one receiver among the receivers that have fed back CQIs; and a transmission part for transmitting the determined CQI feedback quantities to the K receivers, respectively, wherein the received CQIs include a partial CQI, when a CQI feedback scheme used in the multicarrier communication system is a partial CQI feedback scheme, and the partial CQI includes CQIs for particular subcarriers among the CQIs for the N subcarriers, wherein the received CQIs include an average CQI, when the CQI feedback scheme is an average CQI feedback scheme, and the average CQI is generated by averaging the CQIs for the N subcarriers, wherein the scheduler allocates subcarriers for which there are CQIs fed back from at least one receiver among the K receivers, to a receiver that has fed back a CQI indicating the best channel state, and wherein the scheduler allocates subcarriers for which there is no CQI fed back from any receiver among the K receivers among the N subcarriers, to a receiver having minimum throughput at a present timing point among the K receivers.

14. The scheduling apparatus of claim 13, wherein the scheduler randomly allocates subcarriers for which there is no CQI fed back from any receiver among the K receivers among the N subcarriers, to an arbitrary receiver among the K receivers.

15. The scheduling apparatus of claim 13, wherein the CQI feedback quantity determiner determines the respective CQI feedback quantity based on at least one of channel states and reception throughputs of each of the K receivers.

16. An apparatus for feeding back channel quality information (CQI) by a receiver, for a multicarrier communication system using N subcarriers, the apparatus comprising:

a reception part for receiving, from a transmitter, a CQI feedback quantity determined by the transmitter for the receiver and indicative of the number of subcarriers for which CQIs will be fed back among the N subcarriers, and detecting CQIs for the N subcarriers by channel-estimating a signal received from the transmitter;

a CQI generator for generating a CQI to be transmitted to the transmitter; and a transmission part for transmitting the CQI to the transmitter, wherein the CQI generator generates a partial CQI as the CQI by selecting a number of CQIs equal to the CQI feedback quantity among the CQIs for the N subcarriers, when a CQI feedback scheme used in the multicarrier communication system is a partial CQI feedback scheme, and wherein the CQI generator generates an average CQI as the CQI by averaging the CQIs for the N subcarriers, when the CQI feedback scheme is an average CQI feedback scheme, wherein the CQI generator comprises:

an ordering unit for sequentially ordering the COTs for the N subcarriers in an order of a COT indicating the best channel state to a COT indicating the worst channel state; and a selector for selecting as many CQIs as a number corresponding to the COT feedback Quantity from the COTs indicating the best channel quality.

17. The apparatus of claim 16, wherein the CQI generator averages the CQIs for the N subcarriers by arithmetic-averaging the CQIs for the N subcarriers.

18. The apparatus of claim 16, wherein the CQI generator averages the CQIs for the N subcarriers by geometric-averaging the CQIs for the N subcarriers.

19. A scheduling apparatus for a multicarrier communication system using N subcarriers, in which a transmitter communicates with K receivers, the apparatus comprising:

the transmitter for determining a respective channel quality information (CQI) feedback quantity indicative of the number of subcarriers for which CQIs will be fed back among the N subcarriers, for each of the K receivers, transmitting the determined CQI feedback quantities to the K receivers, respectively, and upon receiving CQIs corresponding to the determined CQI feedback quantities, fed back from the K receivers, respectively, allocating subcarriers for which there are CQIs fed back from at least one receiver among the K receivers among the N subcarriers, to any one receiver among the receivers that have fed back CQIs; and the K receivers for receiving the respective CQI feedback quantities from the transmitter, detecting CQIs for the N subcarriers by channel-estimating a signal received from the transmitter, generating, by each of the K receivers, a CQI to be transmitted to the transmitter, and transmitting the CQI to the transmitter, wherein each of the K receivers generates a partial CQI as the CQI by selecting a number of CQIs equal to the CQI feedback quantity among the CQIs for the N subcarriers, when a CQI feedback scheme used in the multicarrier communication system is a partial CQI feedback scheme, wherein the each of K receivers generates an average CQI as the CQI by averaging the CQIs for the N subcarriers, when the CQI feedback scheme is an average CQI feedback scheme, wherein the transmitter allocates subcarriers for which there are CQIs fed back from at least one receiver among the K receivers, to a receiver that has fed back a CQI indicating the best channel state, and wherein the transmitter allocates subcarriers for which there is no CQI fed back from any receiver among the K receivers among the N subcarriers, to a receiver having minimum throughout at a present timing point among the K receivers.

20. The scheduling apparatus of claim 19, wherein each of the K receivers sequentially orders the CQIs for the N subcarriers in order of a CQI indicating the best channel state to a CQI indicating the worst channel state, and selecting as many CQIs as a number corresponding to the respective CQI feedback quantities from the CQIs indicating the best channel quality.

21. The scheduling apparatus of claim 19, wherein each of the K receivers averages the CQIs for the N subcarriers by arithmetic-averaging the CQIs for the N subcarriers.

22. The scheduling apparatus of claim 19, wherein each of the K receivers averages the CQIs for the N subcarriers by geometric-averaging the CQIs for the N subcarriers.

23. The scheduling apparatus of claim 19, wherein the transmitter randomly allocates subcarriers for which there is no CQI fed back from any receiver among the K receivers among the N subcarriers, to an arbitrary receiver among the K receivers.

24. The scheduling apparatus of claim 19, wherein the transmitter determines the respective CQI feedback quantity based on at least one of channel states and reception throughputs of each of the K receivers.

* * * * *

UNITED STATES PATENT AND TRADEMARK OFFICE
CERTIFICATE OF CORRECTION

PATENT NO. : 7,602,872 B2 Page 1 of 1
APPLICATION NO. : 11/112906
DATED : October 13, 2009
INVENTOR(S) : Suh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1137 days.

Signed and Sealed this

Fifth Day of October, 2010

David J. Kappos
*Director of the United States Patent and Trademark Office*